United States Patent
Lau et al.

(10) Patent No.: US 8,712,752 B2
(45) Date of Patent: Apr. 29, 2014

(54) IR(VOLTAGE) DROP ANALYSIS IN INTEGRATED CIRCUIT TIMING

(75) Inventors: Betty Y. Lau, Fremont, CA (US);
Edgardo F. Klass, Palo Alto, CA (US);
Anup S. Mehta, Fremont, CA (US)

(73) Assignee: Apple Inc., Cupertino, CA (US)

(*) Notice: Subject to any disclaimer, the term of this patent is extended or adjusted under 35 U.S.C. 154(b) by 586 days.

(21) Appl. No.: 13/033,433

(22) Filed: Feb. 23, 2011

(65) Prior Publication Data

US 2012/0215516 A1   Aug. 23, 2012

(51) Int. Cl.
*G06G 7/54* (2006.01)
*G06F 17/50* (2006.01)

(52) U.S. Cl.
CPC .................. *G06F 17/5031* (2013.01)
USPC .............. 703/18; 716/108; 716/113

(58) Field of Classification Search
USPC ............ 703/13, 18, 19; 716/108–109, 113
See application file for complete search history.

(56) References Cited

U.S. PATENT DOCUMENTS

| | | | |
|---|---|---|---|
| 7,013,440 B2 | 3/2006 | Croix | |
| 7,065,720 B2 | 6/2006 | Croix | |
| 7,155,691 B2 | 12/2006 | Ratzlaff | |
| 7,194,716 B2 | 3/2007 | Croix | |
| 7,444,604 B2 | 10/2008 | Croix et al. | |
| 7,571,404 B2 * | 8/2009 | Zhao et al. | 716/106 |
| 2005/0257077 A1 * | 11/2005 | Dutta et al. | 713/340 |
| 2009/0031261 A1 * | 1/2009 | Smith et al. | 716/2 |
| 2009/0106720 A1 * | 4/2009 | Nagata | 716/6 |

OTHER PUBLICATIONS

Liao et al. "Temperature and Supply voltage Aware performance and Power Modeling at Microarchitecture Level"., 2005 IEEE., p. 1042-1053.*
Harizi et al. "Efficient Modeling Techniques for Dynamic voltage Drop Analsys". DAC 2007. p. 706-711.*
Wei-Si Jiang, "An Effective EM/IR-drop Flow with UltraSin and VAVO/VAEO," CDNLive Silicon Valley 2007, 13 pages.
Cadence, "Signal Integrity Timing Solution," Signalstorm, Datasheet, 2002 Cadence Design Systems, Inc., 4 pages.
Yi-Min Jiang, et al., "Analysis of Performance Impact Caused by Power Supply Noise in Deep Submicron Devices," 1999 ACM, pp. 760-765.
Ratnakar Goya!, et al., "Current Based Delay Models: A Must for Nanometer Timing," Cadence Design Systems, Inc., 2005, 8 pages.
Altos Design Automation, "Liberate, Improve your view . . . ," 2007, 2 pages.
Wolfgang Roethig, "Library Characterization and Mdoeling for 130nm and 90nm SoC Design," IEEE SoC Conference, Sep. 19, 2003, NEC Electronics America, 59 pages.
"Voltagestorm Power and Power Rail Verification," Datasheet, 2006 Cadence Design Systems, Inc., 4 pages.

* cited by examiner

*Primary Examiner* — Eunhee Kim
(74) *Attorney, Agent, or Firm* — Lawrence J. Merkel; Meyertons, Hood, Kivlin, Kowert & Goetzel, P.C.

(57) ABSTRACT

In one embodiment, an IR drop analysis methodology may include characterizing standard cells without including power parasitic impedances, extracting the power parasitic impedances for the standard cells, and characterizing the standard cells with the power parasitic impedances. A set of timing parameters (such as minimum delays and maximum delays through the cells) may be generated from each characterization. The methodology may include comparing the timing parameters from each characterization, and identifying cells for which additional design effort should be expended to improve the power supply grid (e.g. to reduce the power parasitic impedances). For example, a margin may be budgeted for speed loss (delay increase) due to IR drop. If the difference in the timing parameters exceeds the margin, additional design effort may be warranted.

20 Claims, 3 Drawing Sheets

IR(VOLTAGE) DROP ANALYSIS IN
INTEGRATED CIRCUIT TIMING

BACKGROUND

1. Field of the Invention

This invention is related to the field of timing methodologies for integrated circuit development and, more particularly, to measuring IR drop on power supply interconnect.

2. Description of the Related Art

The design of an integrated circuit, from concept to "tape out" (i.e. the transmission of the data describing the integrated circuit to the fabrication foundry), is a complex series of parallel, interdependent processes such as logic design, circuit design, synthesis, timing analysis, place and route, verification, etc. To successfully fabricate an integrated circuit that performs as specified, all of the various processes must be completed as accurately as possible.

Many integrated circuit design methodologies rely on synthesis using "standard cell" circuits for significant portions of the design. A standard cell may be a predesigned circuit (including layout and interconnection of the transistors used to form the circuit). The standard cell may be instantiated in the integrated circuit and connected to other instantiations of standard cells to implement a block described in a hardware design language (HDL). The same standard cell may be instantiated as many times as desired to realize various functionality in the blocks that form an integrated circuit. Standard cells may be more briefly referred to herein as "cells." Typically, a library of standard cells are designed and provided for synthesis. The library can include a variety of logic gates and somewhat more complex functions that are expected to occur frequently in the design. Multiple cells may be defined for a given function, with each cell having a different drive strength. The multiple cells provide the ability to trade off size for speed in the synthesis step.

One of the challenges with standard cells is the correct determination of delay in the cells under various operating conditions. The delays are used for timing analysis, and thus must be as accurate as possible (and conservative where accuracy might be questionable). For example, a maximum delay parameter for a standard cell must be at least as large as the actual delay of the corresponding circuitry after fabrication (or larger). If the maximum delay parameter were shorter than the actual delay, the block would appear to meet timing during the design but would fail to operate properly when fabricated.

One of the factors that affect the timing of standard cells is the amount of voltage drop on power and ground connections in the cell. The voltage drop is the result of resistance in power/ground network and the combined current of all transistors in the cell drawing current on the grid at any particular time. Accordingly, the drop is often referred to as the IR drop (current (I) multiplied by resistance (R)). To ensure IR drop is within the allocated IR budget for timing analysis, industry standard IR analysis tools are often used. For standard cells, static peak IR flow is used. Static peak IR flow assumes the worst case scenario of all transistors in the entire cell being turned on at the same time. This approach is too pessimistic in many cells. For example, in complex or multiple stage cells, static peak IR flow is overly pessimistic because timing differences between stages are not taken into account. In another example, if transistors within the cell are separated by inverting logic, the transistors and nets separated by inverting stages are mutually exclusive.

SUMMARY

In one embodiment, an IR drop analysis methodology may include characterizing standard cells without including power parasitic impedances (e.g. parasitic resistance and parasitic capacitance), extracting the power parasitic impedances for the standard cells, and characterizing the standard cells with the power parasitic impedances. A set of timing parameters (such as minimum delays and maximum delays through the cells) may be generated from each characterization. The methodology may include comparing the timing parameters from each characterization, and identifying cells for which additional design effort should be expended to improve the power supply grid (e.g. to reduce the power parasitic impedances). For example, a margin may be budgeted for speed loss (delay increase) due to IR drop. If the difference in the timing parameters exceeds the margin, additional design effort may be warranted.

BRIEF DESCRIPTION OF THE DRAWINGS

The following detailed description makes reference to the accompanying drawings, which are now briefly described.

Figure 1:
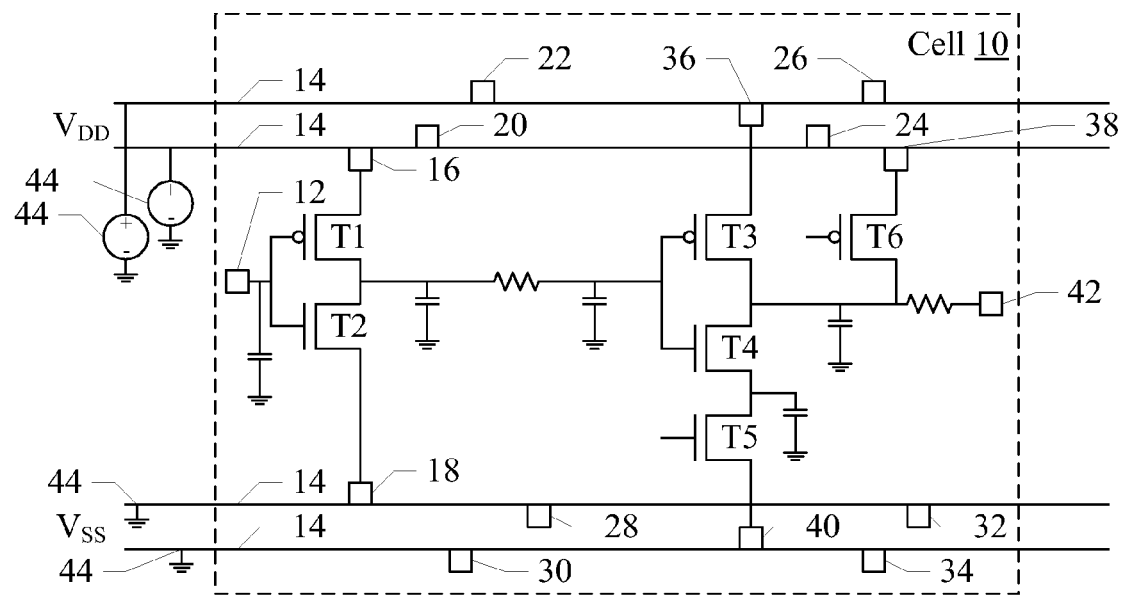
FIG. 1 is a circuit diagram of one embodiment of a cell without power parasitics.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Overview of Standard Cell Circuits

Figure 2:
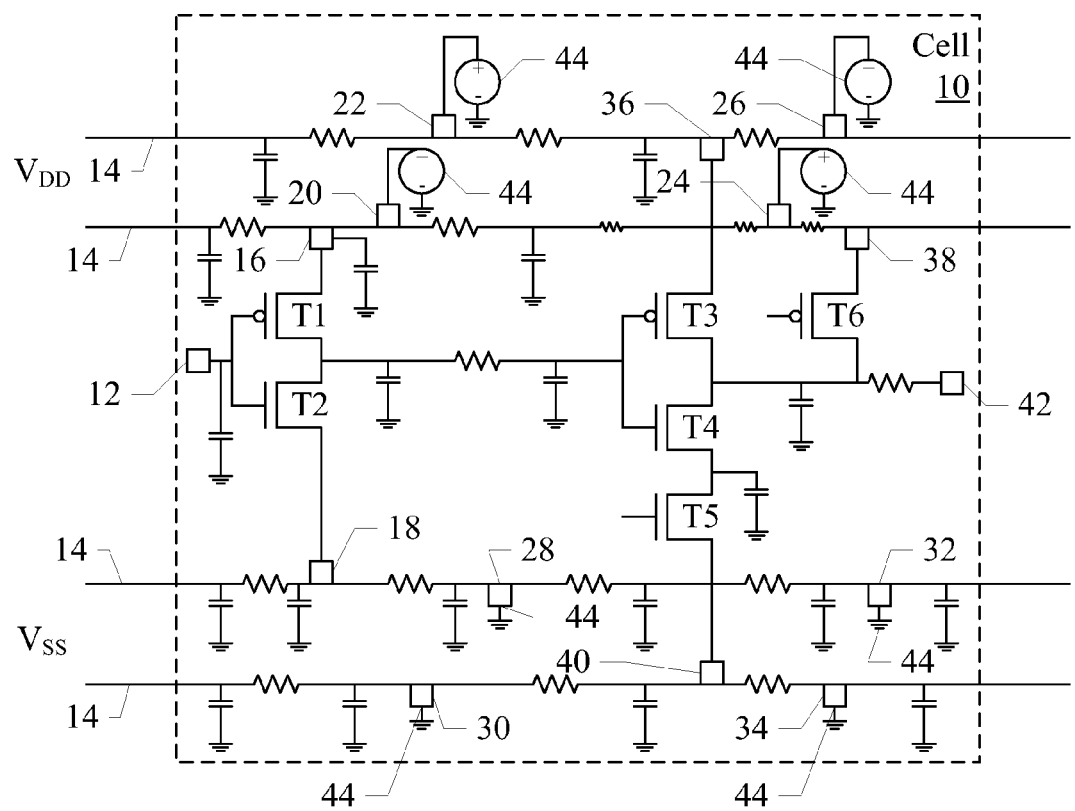
FIG. 2 is a circuit diagram of one embodiment of the cell shown in FIG. 1 with power parasitics.

Turning now to FIGS. 1 and 2, an exemplary standard cell circuit 10 that excludes power parasitic impedances (FIG. 1)

and that includes the power parasitic impedances (FIG. 2) are shown. The exemplary cell 10 is merely one embodiment, and numerous other embodiments of standard cell circuits may be used. The cell 10 may be one standard cell defined in a library of standard cells, for example.

As shown in FIG. 1, the cell 10 includes various transistors T1 to T6. The transistors T1, T3, and T6 are p-type metal-oxide-semiconductor (PMOS) transistors and the transistors T2, T4, and T5 are n-type MOS (NMOS) transistors. The transistors T1 and T2 form an inverter coupled between the power supplies $V_{DD}$ and $V_{SS}$ (e.g. power and ground). The transistors T1 and T2 have gate terminals connected to an input to the cell 10. The connection point for the input is illustrated as a via 12 which may provide connection between the gate terminals (e.g. at a poly-silicon layer of the integrated circuit that employs the cell 10) and a wiring layer at which connections may be made (e.g. metal layer 3, where metal layers 1 and 2 may be used for interconnect local to the cell 10).

Similarly, the power supply interconnect (e.g. wires 14 in FIG. 1) may be provided through wiring layers and thus there may be vias (e.g. vias 16 and 18 respectively) to connect the power supply interconnect to the transistors T1 and T2. While wires 14 are illustrated in FIG. 1, there may be a grid of wires in both horizontal and vertical directions to distribute power/ground in the cell and among cells. There may also be vias from the wires 14 to connect to the "global" $V_{DD}/V_{SS}$ (e.g. vias 20, 22, 24, 26, 28, 30, 32, and 34 in FIG. 1). The global $V_{DD}/V_{SS}$ may be the chip-wide $V_{DD}$ and $V_{SS}$, respectively, that is supplied on $V_{DD}/V_{SS}$ pins to the integrated circuit. Generally, a via may be a conductive connection through an insulating layer that separates two metal layers. Conductors (e.g. wires) in the metal layers may be connected by the vias to form connections between various circuit elements formed on the integrated circuit substrate.

The output of the inverter formed by the transistors T1 and T2 (i.e. the node to which the drains of the transistors T1 and T2 are connected) is coupled to the gate terminals of the transistors T3 and T4. Accordingly, the interconnect between the transistors T1-T4 may be part of the local interconnect within the cell 10. The interconnection between the transistors T1-T4 may be implemented, e.g., at the poly layer, the metal 1 layer, the metal 2 layer, or any combination thereof. Another input (not shown in FIG. 1) may be coupled to the gate terminals of the transistors T5 and T6. Vias 36, 38, and 40 may connect the transistors T3, T6, and T5, respectively, to the wires 14 as shown in FIG. 1. An output of the cell 10 may be provide through the via 42.

Various resistors and capacitors shown in FIG. 1 may represent parasitic resistance and capacitance in the cell 10. Generally, parasitic resistance and capacitance may be properties of the interconnect and the neighboring circuitry, rather than explicit components of the circuit. Thus, for example, the resistance may be a function of the length of the wire and other characteristics (e.g. the material from which the wire is fabricated, width and height of the wire, etc.). The capacitance may be a function of the wire, the insulator between the wire and the substrate or other wires, the presence and proximity of other wires, etc. While resistance and capacitance are shown, other parasitic impedances may also be present (e.g. inductance), although present technologies are typically sufficiently characterized by parasitic resistance and capacitance.

The parasitic impedances illustrated in FIG. 1 are on the signal interconnect in the cell 10. Thus, these parasitic impedances may be referred to as signal parasitic impedances or, more briefly, signal parasitics. The signals in a cell may be anything other than the supply connections ($V_{DD}$ and $V_{SS}$). There may also be parasitic impedances on the power supply wires 14 and the various vias 16, 18, 20, 22, 24, 26, 28, 30, 32, and 34 that connect the power supply wires 14 and/or global power supply grid to the transistors in the cell 10, and these parasitic impedances may be referred to as power parasitic impedances (or more briefly, power parasitics).

Ideal voltage sources 44 are shown in FIG. 1 as well (where the $V_{SS}$ source is illustrated as a ground in this example). The ideal sources 44 may provide $V_{DD}$ and $V_{SS}$ voltages on the wires 14, which are presumed to be free of parasitic impedance in FIG. 1 (along with the corresponding vias 16, 18, 20, 22, 24, 26, 28, 30, 32, and 34). A model that represents the combination of the cell 10 and the ideal sources 44 may be generated for a circuit simulator. For example, various circuit simulators that are compatible with the Simulation Program with Integrated Circuit Emphasis (SPICE) format may be used to simulate the model, and the model may be expressed in SPICE format. Because the wires 14 and vias 16, 18, 20, 22, 24, 26, 28, 30, 32, and 34 are impedance free, the location of the sources 44 is not important to the operation of the model. Indeed, the same source 44 may be used for the $V_{DD}$ wires 14 if only one magnitude of $V_{DD}$ is provided in the cell 10, and one source 44 may be used for the $V_{SS}$ wires.

An ideal voltage source may be a voltage source that has zero impedance and infinite current capability, in one embodiment. While actual voltage sources cannot achieve the ideal, various design techniques may be used to reduce source impedances and increase current capabilities to levels that approximate the ideal for the loads that are experienced in a given circuit.

It is noted that, while the parasitic capacitances are illustrated in FIG. 1 as being connected between various nodes and ground, it is also possible to have parasitic capacitance between two nodes. In some cases, such parasitic capacitances can be modeled as capacitances on each node that are connected to ground. In other case, the capacitance may be modeled as connected between the two nodes.

As mentioned above, FIG. 2 illustrates an embodiment of the cell 10 that includes power parasitics. Accordingly, a variety of resistances are illustrated on the wires 14, effectively dividing the wires into multiple segments. The location of the voltage sources along the wires 14 may thus have an impact on the operation of the circuit because of the IR drop that occurs through the power parasitics. In FIG. 2, ideal sources 44 are connected to each of the vias 20, 22, 24, 26, 28, 30, 32, and 34 to simulate connection of the cell 10 to the global supply grid. However, current flow from these vias to the transistors (e.g. through the power parasitics and the vias 16, 18, 36, 38, and 40) may generate IR drop, and thus the voltage actually experienced at the transistors may be lower than the supply voltage. The effects of the IR drop may vary, but generally slow down the operation of the circuit and result in longer delays from inputs to outputs of the circuit.

IR Drop Methodology

The effects of IR drop on the timing of the cell 10 may be measured using simulations of the models illustrated in FIGS. 1 and 2. The model in FIG. 1 may be simulated, for example, and delays through the cell 10 from, e.g., the input 12 to the output 42 may be measured based on the simulations. More particularly, a characterization tool may be used to characterize the behavior of the cell 10 over multiple simulations with different inputs (both input levels and transition rates, or slew rates, between input levels). The simulations may also be performed over various temperature conditions and/or transistor properties (reflecting various fabrication process conditions, for example). The characterization tool may be configured to identify an exhaustive set of inputs (levels, slew rates, and temporal separation between input changes) and circuit states to properly determine operation of the circuit. The characterization over the exhaustive set of inputs may permit each potential timing path through the cell 10 to be checked for excessive IR drop effects.

From the results of the simulations, the characterization tool may establish various timing parameters for the cell 10. The timing parameters may include, for example, delay parameters describing the delay from a transition on each input to a corresponding transition on the output. The delay parameters may include intrinsic delay, as well as additional delay dependent on the slew rate of the input signal. There may be minimum delay (MinDelay) and maximum delay (MaxDelay) parameters for the cell 10 as a whole and/or for each input to each output. The MinDelay may be the shortest delay for a given input to the output over all the characterization simulations. Similarly, the MaxDelay may be the longest delay for the given input to the output over all the characterization simulations.

To measure the effect of IR drop on the cell 10, the characterization results of the cell 10 from FIGS. 1 and 2 may be compared. More particularly, the difference in each timing parameter from the characterization of the cell without the power parasitics (FIG. 1) and the corresponding timing parameter from the characterization of the cell with the power parasitics (FIG. 2) may specify the effects of the IR drop.

If the difference in timing parameters is large enough, the IR drop may be having too much of an effect on the performance of the cell 10 and it may be desirable to expend additional design effort on the design of the cell 10 to improve performance.

Specifically, the supply grids may be modified to reduce parasitic effects (e.g. widening wires, inserting more connections to the global supply grids, etc.). In one embodiment, a margin may be added to the power-parasitic-free delays to account for IR drop effects. That is, the margin may represent the amount of timing variation budgeted for IR drop effects due to the power parasitics. The modified delays including the margin may be used in timing analysis, for example. If the difference in a given timing parameter is larger than the margin, then the difference may be viewed as "large enough" to identify the cell for improvement/refinement. Other embodiments may implement other thresholds for when a cell's IR drop is large enough (e.g. a percentage of the supply voltage, a maximum absolute value of the drop, a minimum supply voltage, etc.).

The cell 10 as illustrated in FIGS. 1 and 2 highlights inaccuracies that would be introduced if static peak IR analysis were used. The transistors T1 and T2 may be activated first in response to an input signal transition, and thus the current flow through T1 and T2 may overlap with current flow through other transistors T3 to T6 (if any) but peak flow may not overlap and thus static peak IR flow would overstate the voltage drop to be expected in the cell 10. Similarly, the transistors T1 and T2 are an inverting stage. Accordingly, if transistor T1 turns on, transistor T3 will be turning off. Similarly, transistor T2 turns on, transistor T4 will be turning off.

By using characterizations of the cell 10 with and without the power parasitics, the effect of the power parasitics on circuit performance may be isolated and captured. Furthermore, the characterization is performed by simulation of the circuits, and thus the effect of the IR drop caused by the circuit parasitics may be more accurately captured as the difference between each timing parameter generated in the characterization that excludes the power parasitics and the corresponding timing parameter generated in the characterization that includes the power parasitics. As noted above, because the characterizations are exhaustive, each timing path may be evaluated for IR drop effects.

Figure 3:
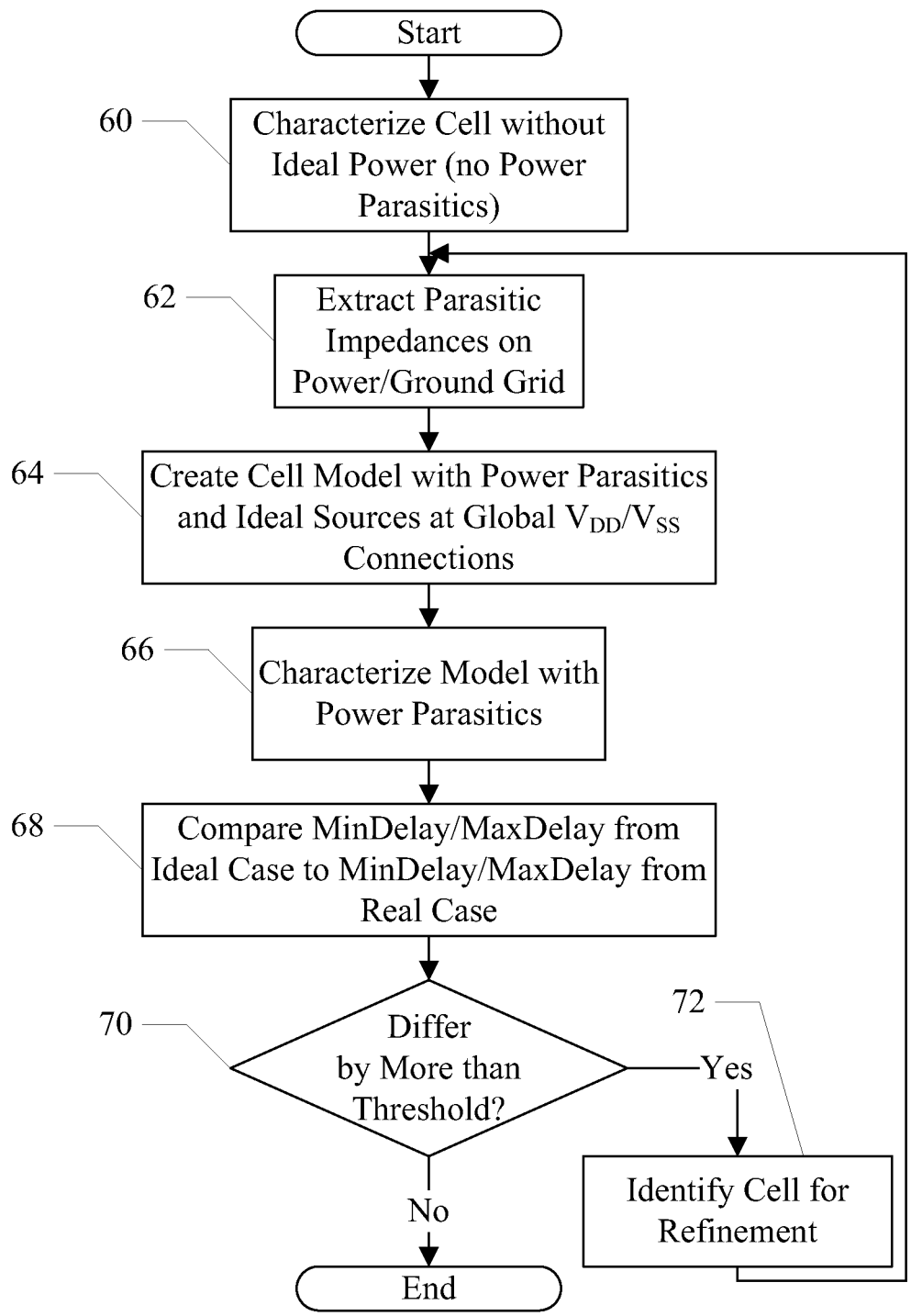
FIG. 3 is a flowchart illustrating operation of one embodiment of IR drop measurement and analysis.

FIG. 3 is a flowchart illustrating operation of one embodiment of IR drop measurement on a cell. In embodiment, the flowchart of FIG. 3 may be implemented in a IR drop measurement tool that may be executed on a computer to perform the operation illustrated in FIG. 3. In some cases, a portion of the flowchart may be implemented in other tools such as a characterization tool and/or an extraction tool. While the blocks are shown in a particular order for ease of understanding, other orders may be used. The operation shown in FIG. 3 is discussed with respect to one cell for convenience. However, the operation may be performed over all cell in a cell library. The library may be processed as a whole, or may be divided into groups which may be processed in parallel on various computers, in some embodiments.

The IR drop measurement tool may characterize the cell 10 without the power parasitics (block 60). Particularly, in one embodiment, the IR drop measurement tool may invoke the characterization tool to characterize the cell, using a model that excludes the power parasitics (e.g. FIG. 1). The model may thus include ideal voltage sources for the $V_{DD}$ and ground ($V_{SS}$) wires 14. The signal parasitics may be part of the model in one embodiment, and may have previously been extracted from the layout of the cell. Alternatively, prior to characterizing the cell 10, the IR drop measurement tool may invoke an extraction tool to extract the signal parasitics (not shown in FIG. 3). A set of timing parameters (e.g. including MinDelay, MaxDelay, etc.) may thus be determined.

The IR drop measurement tool may extract the parasitic impedances on the power supply grids (power and ground, or $V_{DD}$ and $V_{SS}$) (block 62). Particularly, in one embodiment, the IR drop measurement tool may invoke the extraction tool to extract the power parasitics for the cell from the layout of the cell. The IR drop measurement tool may create a new cell model based on the cell model without the power parasitics, inserting the power parasitics and connecting ideal voltage supplies at the points at which the power and ground grids connect to the respective global grids (e.g. at the vias 20, 22, 24, 26, 28, 30, 32, and 34 in FIG. 2) (block 64). The newly-generated model may be similar to the cell 10 illustrated in FIG. 2.

The IR drop measurement tool may characterize the cell 10 with the power parasitics (block 66). Particularly, in one embodiment, the IR drop measurement tool may invoke the characterization tool to characterize the cell, using a model that includes the power parasitics (e.g. FIG. 2). A second set of timing parameters for each timing path (e.g. including MinDelay, MaxDelay, etc.) may thus be determined.

The IR drop measurement tool may compare the set of timing parameters (i.e. comparing each timing parameter in one set with the corresponding timing parameter in the other set, such as MaxDelay compared to MaxDelay, MinDelay compared to MinDelay, etc.) (block 68). The comparison may include, e.g., subtracting the timing parameter from one set from the corresponding timing parameter from the other set to find a difference. If any of the timing parameters have a difference that exceeds a threshold (e.g. the margin for IR drop) (decision block 70, "yes" leg), the IR drop measurement tool may identify the cell as requiring improvement (block 72). The designer may refine the cell, attempting to improve the power/ground grids. The process of extracting the power parasitics, creating the new cell model including the power parasitics, characterizing the new cell model, and comparing timing parameters may be repeated on the refined design (blocks 62, 64, 66, 68, and 70). The process may be repeated until the timing parameters of the cell with power parasitics has timing parameters that do not differ from the timing parameters of the cell without power parasitics by more than the threshold.

It is noted that the threshold may be different for each timing parameter, in some embodiments. Other embodiments may use the same threshold, or subsets of timing parameters may have the same threshold. The threshold may be measured in any desired fashion (e.g. a specified amount of delay, a percentage of the delays, etc.). Generally, a tool as used above may be a program, which may include a set of instructions which, when executed on a computer, implement the operation described for the tool.

Computer Accessible Storage Medium and System

Figure 4:
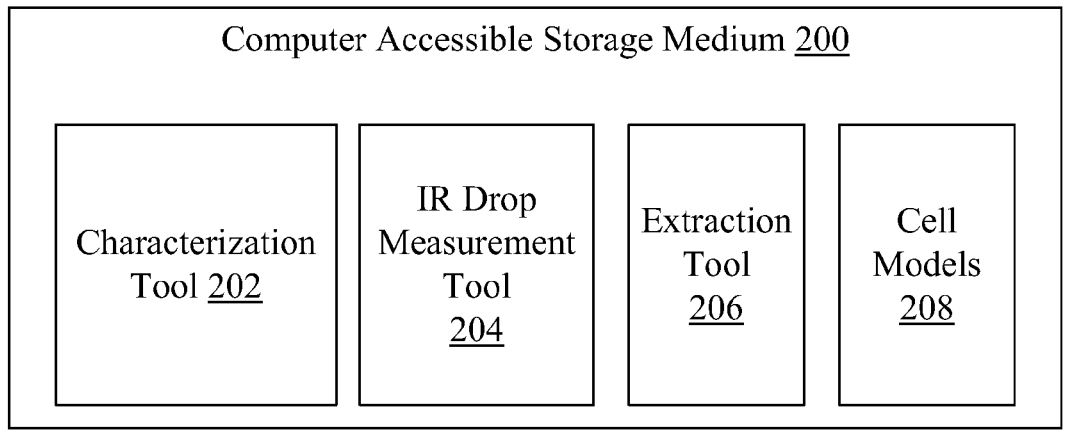
FIG. 4 is a block diagram of one embodiment of a computer accessible storage medium.

Turning now to FIG. 4, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. Storage media may also include non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link.

The computer accessible storage medium 200 in FIG. 4 may store a characterization tool 202, an IR drop measurement tool 204, an extraction tool 206, and/or one or more cell models 208. The characterization tool 202 may include instructions which, when executed on a computer, may be configured to implement the operation described for the characterization tool above. Similarly, the extraction tool 206 may include instructions which, when executed on a computer, may be configured to implement the operation described for the extraction tool above. The characterization tool 202 and/or the extraction tool 206 may include any commercially-available tools from a variety of different vendors (e.g. Synopsys, Cadence, etc.). The IR drop measurement tool 204 may include instructions which, when executed on a computer, may be configured to implement the operation described for the IR drop measurement tool above. For example, the IR drop measurement tool 204 may include instructions which, when executed, implement the operation described above for the IR drop measurement tool with regard to FIG. 3. The cell models 208 may include any models of the cell or cells, including circuit models for the cell that include the power parasitics and that exclude the power parasitics. The cell models may also include other descriptions of the cells, including, for example, register transfer level (RTL) descriptions or other hardware description language (HDL) descriptions, netlists, schematics, and/or general data set II (GDSII) data describing mask objects, etc. A carrier medium may include computer accessible storage media as well as transmission media such as wired or wireless transmission.

Figure 5:
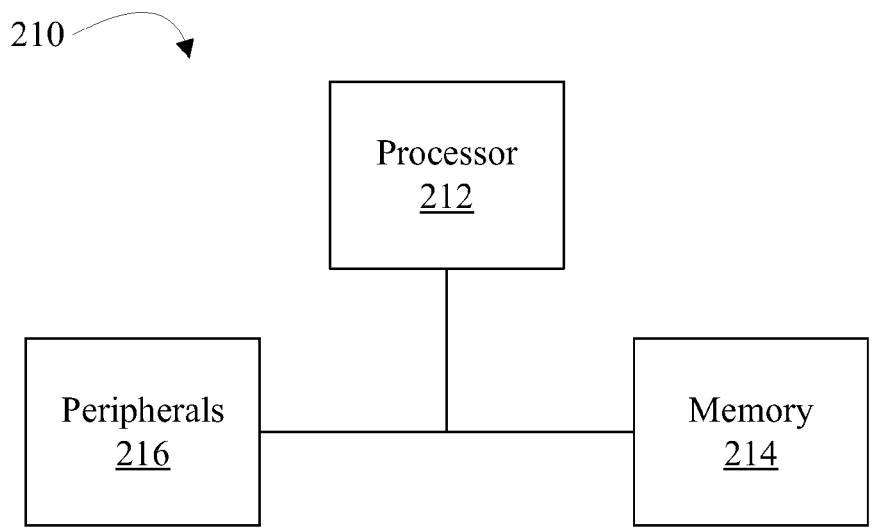
FIG. 5 is a block diagram of one embodiment of a computer system.

FIG. 5 is a block diagram of one embodiment of an exemplary computer system 210. In the embodiment of FIG. 5, the computer system 210 includes a processor 212, a memory 214, and various peripheral devices 216. The processor 212 is coupled to the memory 214 and the peripheral devices 216.

The processor 212 is configured to execute instructions, including the instructions in the software described herein such as the tools 202, 204, and 206. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to coupled the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Peripheral devices 216 may represent any sort of hardware devices that may be included in the computer system 210 or coupled thereto (e.g. storage devices, optionally including a computer accessible storage medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A method comprising:
performing timing analysis on a circuit including a standard cell using timing parameters that include a margin budgeted for a voltage drop in the cell;
extracting, on a computer, parasitic impedances for power and ground connections in the cell;
characterizing, on the computer, the cell with the parasitic impedances;
comparing, on the computer, timing of the cell with the parasitic impedances to timing of the cell without the parasitic impedances; and
identifying, on the computer, the cell for power and ground connection refinement responsive to detecting timing differences that exceed a threshold in the comparing, and wherein the threshold is based on an amount of timing impact budgeted as the margin for the voltage drop in the cell.

2. The method as recited in claim 1 further comprising:
extracting parasitic impedances for signal connections within the cell; and
characterizing the cell without the parasitic impedances on the power and ground connections but with the parasitic impedances on the signal connections to determine timing of the cell without the parasitic impedances on the power and ground connections.

3. The method as recited in claim 1 further comprising:
modifying a design of the cell; and
repeating the extracting, the characterizing, and the comparing on the modified design.

4. The method as recited in claim 3 further comprising determining that the cell does not require power and ground connection refinement during the repeating.

5. A non-transitory computer accessible storage medium storing a plurality of instructions which, when executed:
determine one or more first timing parameters for a cell, including effects of parasitic impedances on a power supply grid within the cell;
determine one or more second timing parameters for the cell, excluding effects of parasitic impedances on the power supply grid;
compare the one or more first timing parameters to the one or more second timing parameters;
perform timing analysis on a circuit including the cell using third timing parameters that include a margin for a voltage drop in the cell; and
determine whether or not the cell requires refinement responsive to a result of the compare, wherein the cell requires refinement if a difference between at least one of the first timing parameters and a corresponding one of the second timing parameters exceeds the margin in a corresponding one of the third timing parameters that is budgeted for the voltage drop in the cell.

6. The non-transitory computer accessible storage medium as recited in claim 5 wherein the predetermined amount is derived from an assumed impact of a voltage drop due to parasitic impedances on the power supply grid.

7. The non-transitory computer accessible storage medium as recited in claim 5 wherein the parasitic impedances include resistance in the conductors that form the power grid.

8. The non-transitory computer accessible storage medium as recited in claim 7 wherein the parasitic impedances include capacitance on the conductors.

9. The non-transitory computer accessible storage medium as recited in claim 5 wherein the one or more timing parameters include a maximum delay through the cell.

10. The non-transitory computer accessible storage medium as recited in claim 9 wherein the one or more timing parameters further include a minimum delay through the cell.

11. The non-transitory computer accessible storage medium as recited in claim 5 wherein the instructions which, when executed, determine one or more first timing parameters for a cell comprise instructions which, when executed:
characterize the cell over a plurality of circuit simulations of the cell with the parasitic impedances, the plurality of simulations applying a set of stimulus vectors to the cell and varying conditions of the cell.

12. The non-transitory computer accessible storage medium as recited in claim 11 wherein the conditions comprise temperature and supply voltage variations.

13. A computer system comprising:
at least one processor configured to execute instructions; and
a non-transitory computer accessible storage medium coupled to the at least one processor, the computer accessible medium storing:
a characterization tool;
an extraction tool; and
a program which, when executed by the at least one processor:
invokes the characterization tool to characterize a plurality of cells with an ideal power supply;
invokes the extraction tool to extract power parasitic impedances from the plurality of cells;
invokes the characterization tool to characterize a plurality of cells including the power parasitic impedances; and
identifies which of the plurality of cells are to be refined responsive to differences in one or more timing parameters generated by the characterization tool using the ideal power supply and with the power parasitic impedances, wherein which of the plurality of cells are to be refined are those for which the differences in the one or more timing parameters exceed a predetermined margin used for timing impacts of a voltage drop in the cell, wherein the predetermined margin is applied to second timing parameters used for performing timing analysis on a circuit that includes the cell.

14. The computer system as recited in claim 13 wherein the one or more timing parameters comprise one or more delays from cell inputs to cell outputs.

15. The computer system as recited in claim 13 wherein the characterization tool and the extraction tool are executed on the at least one processor.

16. The computer system as recited in claim 13 wherein the program, when executed by the processor, creates a model of each of the plurality of cells for the characterization tool, wherein the model includes the power parasitic impedances and further includes ideal voltage sources connected to a power grid within the cell at points at which the power grid within the cell is connected to a global power grid for an integrated circuit including the cell.

17. A method comprising:
simulating, on a computer, a first model of a circuit, wherein the first model includes parasitic impedances on signal connections and an ideal power supply;
determining, on the computer, a first set of delays through the circuit responsive to simulating the first model;
extracting, on the computer, power parasitic impedances;
simulating, on the computer, a second model of the circuit, wherein the second model includes the power parasitic impedances and connections to ideal power supplies at points on a power grid corresponding to the circuit at which the circuit is coupled to a global power supply grid of an integrated circuit;
determining, on the computer, a second set of delays through the circuit responsive to simulating the second model;
comparing, on the computer, the first set of delays and the second set of delays; and
identifying the circuit for additional design work responsive to the comparing wherein the identifying is performed responsive to a difference between a first delay in the first set and the second set exceeding a threshold, and wherein the threshold is based on a margin added to the delay for voltage drop on the power supply grid, wherein the margin is applied to a third set of delays used for timing analysis of another circuit that includes the circuit.

18. The method as recited in claim 17 further comprising generating the second model, the generating including inserting the power parasitic impedances into the first model.

19. A non-transitory computer accessible storage medium storing:
a first cell model corresponding to a first cell, the first cell model excluding power parasitic impedances;
a second cell model corresponding to the first cell, the second cell model including power parasitic impedances extracted from a layout of the first cell;
a plurality of instructions which, when executed:
determine a first delay through the first cell responsive to the first cell model;

determine a second delay through the first cell responsive to the second cell model;

determine that the second delay exceeds the first delay by an amount that is greater than a second amount budgeted for an effect of the power parasitic impedances, wherein the second amount is applied to a third delay used for timing analysis of a circuit that includes the first cell; and identify the first cell for modification of a power grid associated with the first cell responsive to determining that the second delay exceeds the first delay by the amount that is greater than the second amount.

20. The non-transitory computer accessible storage medium as recited in claim 19 further storing an extraction tool which, when executed, extract the power parasitic impedances.

* * * * *